United States Patent
Droste et al.

(10) Patent No.: US 12,498,331 B2
(45) Date of Patent: Dec. 16, 2025

(54) DEVICE FOR INSPECTING THE SURFACE OF A TRANSPARENT OBJECT, AND CORRESPONDING METHOD

(71) Applicant: ISRA VISION GmbH, Darmstadt (DE)

(72) Inventors: Josef Droste, Glandorf (DE); Jürgen Reckow, Rhede (DE)

(73) Assignee: ISRA VISION GmbH, Darmstadt (DE)

( * ) Notice: Subject to any disclaimer, the term of this patent is extended or adjusted under 35 U.S.C. 154(b) by 159 days.

(21) Appl. No.: 18/257,157

(22) PCT Filed: Dec. 13, 2021

(86) PCT No.: PCT/EP2021/085528
§ 371 (c)(1),
(2) Date: Jun. 13, 2023

(87) PCT Pub. No.: WO2022/128936
PCT Pub. Date: Jun. 23, 2022

(65) Prior Publication Data
US 2024/0102940 A1 Mar. 28, 2024

(30) Foreign Application Priority Data
Dec. 14, 2020 (DE) .......................... 102020133397.8

(51) Int. Cl.
*G01N 21/896* (2006.01)
*G01N 21/88* (2006.01)

(52) U.S. Cl.
CPC ....... *G01N 21/896* (2013.01); *G01N 21/8806* (2013.01); *G01N 2021/8841* (2013.01);
(Continued)

(58) Field of Classification Search
CPC ............. G01N 21/896; G01N 21/8806; G01N 2021/8841; G01N 2021/8848; G01N 2021/8967
See application file for complete search history.

(56) References Cited

U.S. PATENT DOCUMENTS

| | | | |
|---|---|---|---|
| 4,889,998 A | 12/1989 | Hayano et al. | |
| 5,245,403 A * | 9/1993 | Kato | G01N 21/94 356/239.8 |

(Continued)

FOREIGN PATENT DOCUMENTS

| | | |
|---|---|---|
| CN | 108760765 A | 11/2018 |
| DE | 8436587 U1 | 5/1986 |

(Continued)

OTHER PUBLICATIONS

International Search Report for International Patent Application No. PCT/EP2021/085528 dated Apr. 20, 2022; priority document.

(Continued)

*Primary Examiner* — Georgia Y Epps
*Assistant Examiner* — Monica T Taba
(74) *Attorney, Agent, or Firm* — Greer, Burns & Crain Ltd.

(57) ABSTRACT

A device for inspecting a foil-type transparent object. The device has a camera and at least one light source. The light source is arranged such that the electromagnetic radiation emitted by the light source illuminates a line-shaped area of a first surface of the object from above or a second surface of the object from below. The illumination is at a predetermined angle ($\alpha$) to the respective illuminated surface. The camera is arranged to detect the intensity of the back-reflected electromagnetic radiation in at least a portion of the line-shaped area. The predetermined angle ($\alpha$) is less than or equal to 15° and the electromagnetic radiation emitted by the light source (20) is predominantly linear and s-polarized. Also a method of inspection.

11 Claims, 2 Drawing Sheets

(52) U.S. Cl.
CPC .............. *G01N 2021/8848* (2013.01); *G01N 2021/8967* (2013.01)

(56) References Cited

U.S. PATENT DOCUMENTS

| | | |
|---|---|---|
| 5,748,305 A | 5/1998 | Shimono et al. |
| 6,144,446 A | 11/2000 | Nagasaki et al. |
| 2006/0007435 A1* | 1/2006 | Biellak .................. G01N 21/47 356/237.3 |
| 2010/0060895 A1* | 3/2010 | Oshima .............. G01N 21/9501 356/369 |
| 2010/0214564 A1 | 8/2010 | Kim et al. |
| 2011/0187849 A1 | 8/2011 | Kim et al. |
| 2019/0187067 A1 | 6/2019 | Liu et al. |
| 2020/0256804 A1* | 8/2020 | Honda ............... G01N 21/8806 |

FOREIGN PATENT DOCUMENTS

| | | |
|---|---|---|
| DE | 3626724 A1 | 2/1988 |
| DE | 68919120 T2 | 5/1995 |
| DE | 69117714 T2 | 10/1996 |
| DE | 102005007715 A1 | 8/2006 |
| JP | S63186132 A | 8/1988 |
| JP | H0915163 A | 1/1997 |
| JP | H11284038 A | 10/1999 |
| JP | 2001249080 A | 9/2001 |

OTHER PUBLICATIONS

International Preliminary Report on Patentability for International Patent Application No. PCT/EP2021/085528 dated Apr. 18, 2023; priority document (English Translation).

* cited by examiner

DEVICE FOR INSPECTING THE SURFACE OF A TRANSPARENT OBJECT, AND CORRESPONDING METHOD

CROSS-REFERENCES TO RELATED APPLICATIONS

This application is a national phase of International Patent Application No. PCT//EP2021/085528, filed on Dec. 13, 2021, which claims priority to German Patent Application No. 10 2020 133 397.8, filed on Dec. 14, 2020, the entire disclosures of which are incorporated herein by way of reference.

FIELD OF THE INVENTION

The invention relates to the inspection of the surface of a foil-type transparent object, for example thin flat glass or transparent film, and a corresponding method therefor.

BACKGROUND OF THE INVENTION

Thin flat glass or transparent film, which is, for example, 0.01 millimeter to a few millimeters thick, is mainly used in the optics, electronics and display industries, for example for the manufacture of liquid crystal displays or liquid crystal screens. Thin flat glass is also known as thin glass, display glass or microsheet. Thin flat glass or film has a surface on one top side and a surface on a bottom side opposite to the top side, which have a comparatively large expansion in relation to the thickness of the object. In the production of such objects, the purity of these surfaces is an important criterion. Therefore, during the production of flat glass, for example, it is monitored whether there are particles on the glass surface and how they are distributed on the surface. Such particles can be very small, i.e. their diameter can be only a few micrometers.

The optical inspection of glass and films has been known for some time. Typically, a camera-based method with strong dark-field illumination is used to detect contamination. This method detects particles on the top and bottom of the thin flat glass at the same time. This method is called AB-Side. However, it cannot distinguish between particles on the top side and the bottom side.

However, for further processing of the transparent object, e.g. targeted cleaning of the flat glass, it would be desirable to be able to assign the contamination to one of the two sides, i.e. either the top side or the bottom side.

SUMMARY OF THE INVENTION

An object of the present invention is thus to provide a device with which the size and distribution of particles on only one side of the transparent article can be determined separately, i.e. either on the top side or on the bottom side. Similarly, the task is to provide a corresponding method.

The above task may be solved by the device having the features of one or more embodiments described herein and the method having one or more embodiments described herein.

The device according to the invention for inspecting a foil-type transparent object having a first surface on the top side and a second surface on the bottom side of the transparent object comprises, in particular, a camera and at least one light source. The foil-type transparent object may have a thickness (dimension) of, for example, 0.1 mm to a few millimeters. Here, the top side and bottom side of the transparent object are the two opposite sides which have the greatest expansion. Accordingly, "above" refers to the space above the top side and "below" to the space below the bottom side. The thickness is the material dimension of the object between the top and the bottom.

The term "transparency" is used to describe an optical property of the material of the article, namely its transmissivity to electromagnetic radiation. In particular, the invention is applicable to objects whose transparency to electromagnetic radiation is at least 50% at least in a subsection of a wavelength range between 300 nm and 3 μm, preferably a wavelength range between 380 nm and 780 nm (visible light). The light source is arranged such that the electromagnetic radiation emitted by the light source illuminates a line-shaped area of the first surface from above or of the second surface of the object from below. The wavelength of the electromagnetic radiation used by the light source lies, for example, in a wavelength range between 300 nm and 3 μm, preferably in a wavelength range between 380 nm and 780 nm (visible light). The light source thus illuminates a surface of the transparent object facing the light source in the line-shaped area, which may, for example, have a dimension (length) in a range from 1 cm to 10 m in a direction along the line and a dimension (width) in a range from a few lam to a few mm in a direction transverse to the line. The line-shaped area illuminated by the light source is somewhat larger or of the same size in relation to the detection area of a camera, which is designed, for example, as a line scan camera and detects the electromagnetic radiation reflected back from the line-shaped area. In this case, the illumination takes place at a predetermined angle to the respective illuminated surface, the camera being set up in such a way that it detects the intensity of the electromagnetic radiation reflected back, i.e. the intensity of the electromagnetic radiation reflected in the direction of the light source, into at least one section of the line-shaped area. The camera is thus arranged on the same side of the object, i.e. on the side facing the light source. It is further provided that the predetermined angle is less than or equal to 15° and the electromagnetic radiation is predominantly linear and s-polarized (i.e. transversely electrically polarized). Preferably, the predetermined angle is in the range of 3° to 12°, more preferably in the range of 5° to 10°. Here, the polarization direction of the electric field vector is meant, the oscillation direction of which is constant (linear polarization). S-polarized here means that the electric field of the electromagnetic radiation is perpendicular to the plane of incidence. The expression "predominantly s-polarized" means that the degree of polarization (proportion of s-polarized radiation) is at least 75%, preferably at least 90%, particularly preferably at least 95%. Since the electromagnetic radiation reflected from the non-soiled surface is reflected away from the light source, the camera only detects the intensity of the electromagnetic radiation reflected back from particles on the surface towards the camera or light source. In particular, the camera detects the intensity of the electromagnetic radiation reflected back from the illuminated line-shaped area of the surface in the direction of the at least one light source. If the camera detects a high back-reflected intensity in subareas of the line-shaped area, it is assumed that particles are present on the surface there which contaminate this surface.

The device according to the invention has the advantage that only comparatively little light penetrates the transparent object due to the extremely small illumination angle (predetermined angle less than or equal to 15°). The proportion of light that is reflected depends on the illumination angle.

With a small illumination angle, most of the incident light is reflected in a direction away from the light source (and thus the camera) and a very small proportion penetrates the transparent object. The same effect occurs again on the opposite side of the transparent object to the illuminated surface. Only a very, very small portion of the incident light reaches the contaminating particles located on the surface opposite the illuminated surface.

It is also known that electromagnetic radiation is partially reflected at the interface of two media (i.e. here at the illuminated surface of the transparent object) and partially refracted into the second medium (here the transparent material). Here, the proportion of reflected and thus also of refracted radiation is different for s-polarized light than for p-polarized light. This law is used in an inventive way so that mainly s-polarized electromagnetic radiation is used for illumination. At small illumination angles—as in the present case—a large proportion of the s-polarized electromagnetic radiation is reflected, the transmitted proportion is comparatively small. With p-polarized light, this effect also occurs, but only at extremely small angles, which for reasons of space can only be realized in practice with a great deal of effort. At less small angles, the reflected portion of p-polarized light decreases very quickly. If only s-polarized light is irradiated, the p-polarized portion of the incident electromagnetic radiation is very small and the portion of the total illumination that is refracted into the transparent body is very small. In contrast, a large portion of the incident s-polarized radiation is reflected and only a small portion is refracted into the transparent body. Thus, only a vanishingly small part of the light reaches the surface of the transparent object, which is opposite the illuminated surface.

From both effects described above, it follows that the proportion of electromagnetic radiation passing through the transparent object is very small. Thus, very little light reaches the soiling on the side opposite the illuminated surface. Thus, in the corresponding camera image, the respective particles on the surface facing the camera are detected with a significantly greater intensity than those on the side facing away from the camera, so that the contaminating particles on the surface facing the camera can be distinguished from the particles located on the opposite side of the object. The light reflected back in the direction of the at least one light source is detected by the camera and serves as a basis for determining where this surface contaminating particles are located and how large they are.

In one embodiment, the optical path of the camera in an object-side end section adjacent to the illuminated line-shaped area of the respective surface encloses an angle with the optical path of the electromagnetic radiation emitted by the light source which is smaller than 20°, preferably smaller than 10°, particularly preferably smaller than 5°. By arranging the light source and the camera at the same or said very small angle, negative effects on the inspection caused by a change in position of the surface of the object on the focus of the camera and the intensity of the illumination are largely prevented. Height variations in the material do not cause the illuminated line-shaped area of the illuminated surface to move out of the detection range of the camera. In this embodiment, the optical path of the camera includes an angle with the optical path of the electromagnetic radiation emitted by the light source, i.e. with the radiation of the incident light, that is smaller than 5°. Preferably, the angle is less than 3°, more preferably less than 1°. In one embodiment, the optical path of the camera can be arranged such that it runs in a plane with the optical path of the light source in the end section adjacent to the illuminated line-shaped area of the respective surface.

The device according to the invention and the method according to the invention are particularly applicable to objects made of glass (for example silicate glass) or plastic. The object may have a ribbon-like configuration, i.e. pass the device according to the invention at a predetermined speed, or be inspected as a single piece.

In one embodiment, two or more light sources are provided. In another embodiment, the one or two or more than two light sources are in the form of a laser with line optics, wherein the line optics expand the light beam leaving the laser to form a line. The line-shaped laser beam thus generated illuminates the line-shaped area of the first surface from above or the line-shaped area of the second surface from below with high intensity, e.g. with a light power in the range of 1 mW and 10 mW per line millimeter. Due to the line optics, the electromagnetic radiation emitted by the light source expands in the direction of the object, so that the light source and the emitted radiation have a small space requirement on the side facing the light source. For example, a laser (e.g. a diode laser) with a frequency in the visible wavelength range can be used as a laser, which also has the advantage that it emits only polarized light by itself. It then only has to be aligned in such a way that the light is s-polarized with respect to the direction of incidence on the surface.

In one embodiment, two light sources may be provided, each illuminating a portion of the line-shaped area of the surface. In this embodiment, a single camera is provided which observes both portions of the line-shaped area. More than one camera may also be provided.

In one embodiment, an object-side end portion of the optical path of the camera is bounded at one end by a deflection mirror and at the opposite end by the illuminated surface of the object. In other words, the object-side end portion of the optical path of the camera is formed between the surface of the object facing the camera and a deflection mirror at which the optical path of the camera is angled. The deflection mirror deflects the camera's viewing direction by 90°, for example; other angles in an angular range of 20° to 170° are also conceivable. This enables a space-saving arrangement of the camera, and further deflection mirrors can also be arranged in the optical path of the camera.

A particularly simple construction of the device can be achieved by placing the at least one light source next to the above-mentioned deflection mirror, which is arranged in the optical path of the camera. Here, "adjacent" means that the at least one light source is placed at a small distance in the direction transverse to the optical path of the camera, in the plane spanned by the line-shaped area of the illuminated surface and the optical path of the camera. This allows the light from the at least one light source to pass laterally past the deflection mirror and, from the deflection mirror, the optical path of the camera and the light source run in a common plane or at the small angle (less than 5°) indicated above. Illumination direction of the light source and viewing direction of the camera are thus the same. In a further embodiment, one light source is arranged on each side next to the deflecting mirror.

Alternatively or additionally, the deflecting mirror can be designed to be partially transparent and the at least one light source can be arranged behind the deflecting mirror, as seen from the transparent object. The electromagnetic radiation emitted by the light source then passes through the deflection mirror and subsequently in a plane with the optical path of the camera, for example the optical paths of the camera and the light source between the deflection mirror and the surface of the transparent object are identical. Thus, also in this case, the direction of illumination and the direction of view of the camera are the same.

In one embodiment, the camera is designed as a line scan camera which detects the intensity of the reflected electromagnetic radiation pixel by pixel and along the illuminated line-shaped area. The line scan camera may have CCD, NMOS, InGaAs and/or CMOS sensors. The line scan camera is advantageous for the device according to the invention in contrast to the two-dimensional sensor, which has a plurality of lines. Although line sensors have approximately the same pixel sizes as area sensors, the line length can be much greater. Instead of the maximum 1,000 to 4,000 pixel width of area sensors, a line scan camera can have 17,000 pixels or more. Consequently, a line scan camera provides better spatial resolution for a given object field. In addition, a line can be read out much faster than an area. In particular, it is advantageous if, in order to realize a usually substantially higher clock rate compared to an area scan camera, a higher radiation intensity of the light source is provided. Another major advantage is that in a longitudinal direction (namely transversely to the line/width of the object) exactly the same illumination geometry is used in a composite image in each line.

The method according to the invention for inspecting a foil-type transparent object having a first surface on the top side and a second surface on the bottom side of the transparent object is in particular carried out with a device comprising a camera and at least one light source. By means of the electromagnetic radiation emitted by the at least one light source, a line-shaped area of the first surface is illuminated from above or of the second surface of the object from below, the illumination taking place at a predetermined angle to the respective illuminated surface. Further, by means of the camera, the intensity of the electromagnetic radiation reflected back towards the at least one light source is detected in at least a portion of the line-shaped area, wherein the predetermined angle is less than or equal to 15° and the electromagnetic radiation emitted by the light source is predominantly linearly polarized and s-polarized, wherein based on the intensity of the reflected electromagnetic radiation detected by the camera (i.e. from the detected intensity data), the degree of contamination of the illuminated surface is determined. This procedure is based on the above explained findings of the inventors regarding the advantageous reflection behavior of electromagnetic radiation at a small angle of incidence, whereby the electromagnetic radiation is predominantly linearly polarized and s-polarized.

In an embodiment example with the advantages already described above, the camera is oriented in such a way that the optical path of the camera in an object-side end portion adjacent to the illuminated line-shaped area of the respective surface encloses an angle smaller than 5° with the optical path of the electromagnetic radiation emitted by the light source. The embodiments given above for arranging the optical paths of the light source and the camera apply in the same way to the method according to the invention.

In one embodiment example, the intensity of the electromagnetic radiation reflected from the illuminated line-shaped area of the surface is detected pixel by pixel, for example by means of a line scan camera.

In a further embodiment, the position and/or the size of particles causing the contamination, which are arranged on the illuminated surface of the transparent object, is determined from the intensity data described above (i.e. the data of the back-reflected intensity of the electromagnetic radiation determined by the camera from the line-shaped area) by means of a data processing device which is connected to the camera and to which the determined intensity data is transmitted. For example, the camera determines for each pixel a light intensity that is between the value 0 and a maximum intensity value (for example, the value 255). In addition, each pixel of the camera can be assigned a location on the surface of the illuminated side of the transparent object, i.e. on the first surface or the second surface. This can be realized, for example, by defining two-dimensional coordinates and assigning them to corresponding locations on the surface of the object. Through corresponding calibration, the data processing device knows which location(s) with which coordinates is/are currently illuminated by the light source and thus from which location(s) the back-reflected intensity of the electromagnetic radiation is currently detected by the camera accordingly. This results in particular from the arrangement of the light source(s) and/or the camera, the (initial) position of the ribbon of the transparent object and its feed speed (when inspecting a tape-shaped transparent object). Since the back-reflected electromagnetic radiation detected by the camera is in the illuminated area, each pixel can thus be assigned a location or coordinate on the surface of the object. If an intensity is detected that is above a first, predetermined first intensity threshold, it is concluded that a particle contaminating the surface is present at the corresponding, assigned location (expressed by the two-dimensional coordinates) on the surface associated with the light source and the camera. For more precise statements on the size of the soiling particles, the intensity of the back-reflected light can be evaluated. For example, intensity sub-ranges can be defined in advance into which the intensity range between the first intensity threshold and the maximum intensity value is divided. For example, four intensity sub-ranges can be defined. By assigning the measured intensity at each pixel, the size of the respective particle can thereby be determined, assuming that a higher measured intensity is generated by a larger contaminating particle. Consequently, the data processing device (e.g. a microprocessor) may determine the location of a contaminating particle on either surface and/or its size. In this regard, a particle or a conglomerate of multiple particles may extend over multiple pixels.

When inspecting the surface of a foil-type transparent object, e.g. a thin sheet of flat glass, over its entire extent in the longitudinal direction (i.e. transversely to the width of the object), the procedure is, for example, to move the object with respect to the device. In a direction transverse to the direction of movement of the object, the illuminated line-shaped area is arranged so that, if possible, the entire width of the object is covered. If necessary, several devices according to the invention are arranged next to each other in order to cover the entire width of the transparent object. By moving the object, the entire surface on one side of the object is inspected. Alternatively, the device can be moved along the object for inspection.

With such an inspection, flat objects, i.e. objects with a continuously formed surface can be inspected very well with regard to the contamination of their respective top or bottom side separately.

BRIEF DESCRIPTION OF THE DRAWINGS

In the following, further advantages, features and possible applications of the invention are described with reference to a preferred embodiment and the figures. All the features described and/or illustrated thereby constitute the subject-matter of the present invention, also irrespective of their summary in the claims and their back references.

Schematically shown are.

DETAILED DESCRIPTION OF THE PREFERRED EMBODIMENTS

Figure 1:
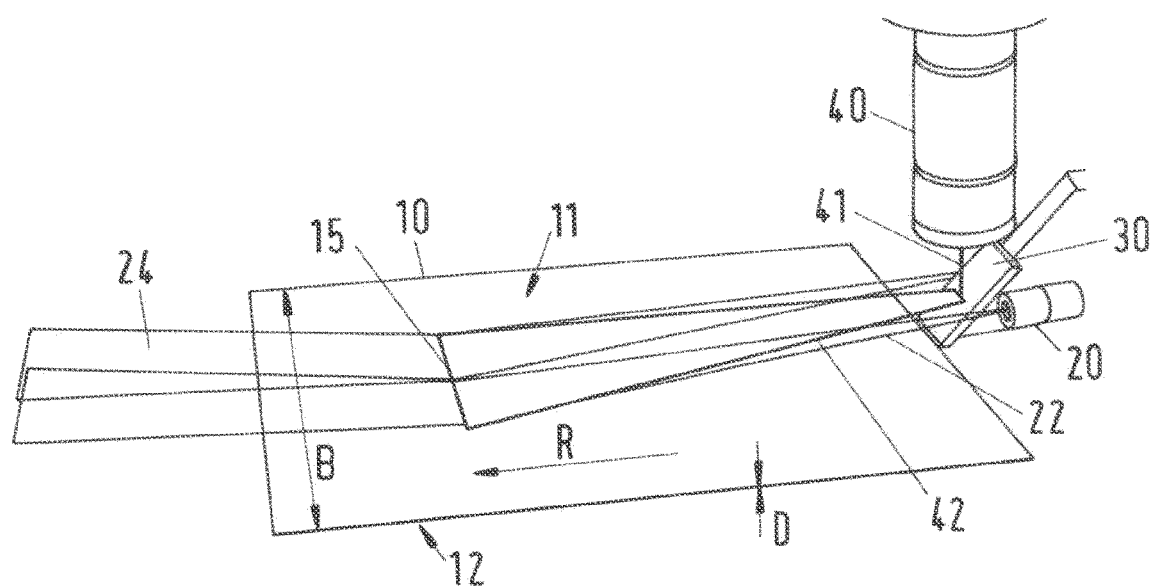
FIG. 1 is a section of a first embodiment of a device according to the invention during inspection of a foil-type transparent object in a perspective view from the side.
Figure 2:
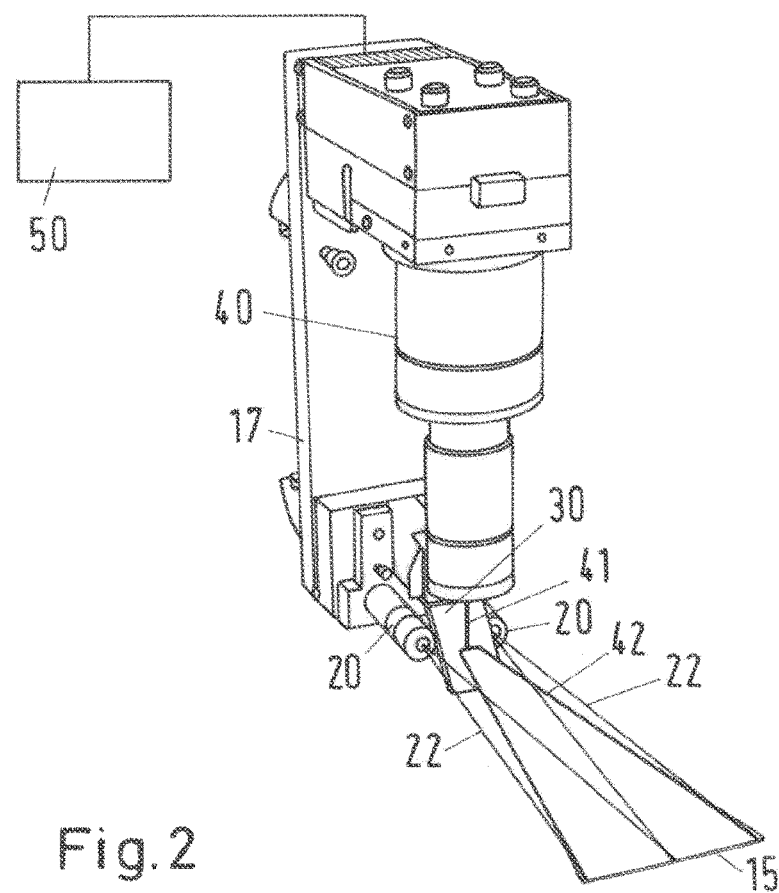
FIG. 2 is a perspective view from the front of the example according to FIG. 1.
Figure 3:
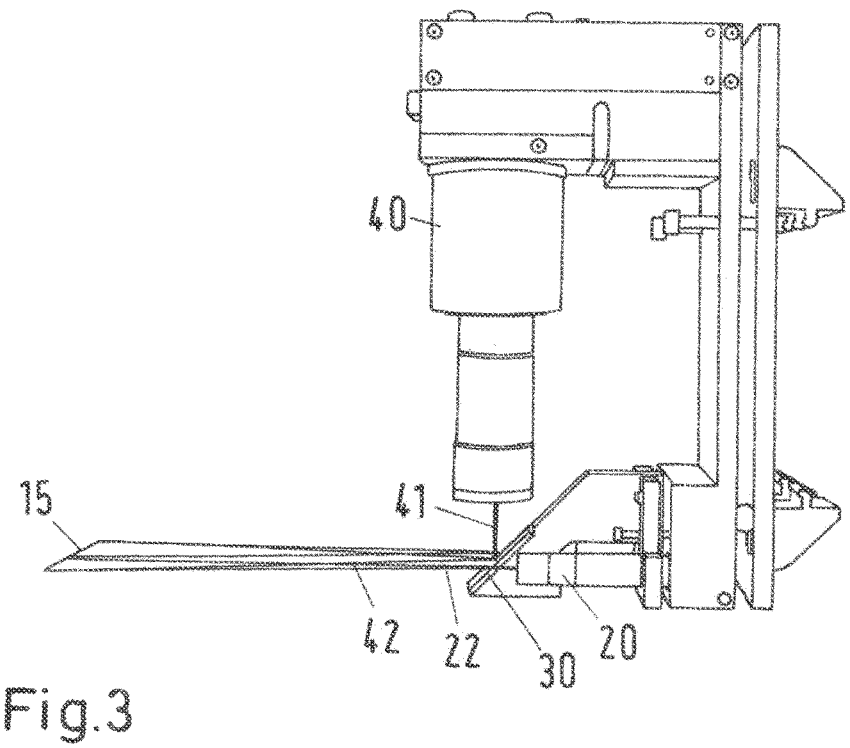
FIG. 3 is a further perspective view from the side of the embodiment according to FIG. 1.

FIGS. 1 to 4 show a first embodiment of a device according to the invention for inspecting a transparent object. The object is, for example, transparent flat glass 10, which runs in the form of an endless ribbon of a width B of, for example, 1 m in the direction R past the device at a constant speed. The flat glass 10 has a first surface 11 on the top side and a second surface 12 on the bottom side. The thickness (dimension) D of the flat glass 10 can be, for example, 0.1 mm to a few millimeters.

For inspecting the first surface 11 of the flat glass with respect to particulate contamination, the device comprises two lasers 20 arranged side by side (e.g. diode lasers, wavelength of the laser for example in the wavelength range of visible light), which have line optics and illuminate a line-shaped area 15 with a length of 50 cm on the first surface 11. The width of the line-shaped area (transverse to the length) is in the range indicated above. Both lasers emit linearly polarized light which is s-polarized. The lasers 20 are mounted on a support plate 17 which is attached to a frame overhanging the flat glass ribbon. Due to the line optics, the light leaving the laser 20 is each spread out into a broad, line-like light beam 22, so that when the light beam hits the first surface 11 of the flat glass 10, only the line-shaped area 15 is illuminated. In this case, the two lasers 20 are arranged next to each other in such a way that each laser 20 illuminates a section of half the length of the line-shaped area 15.

Figure 4:
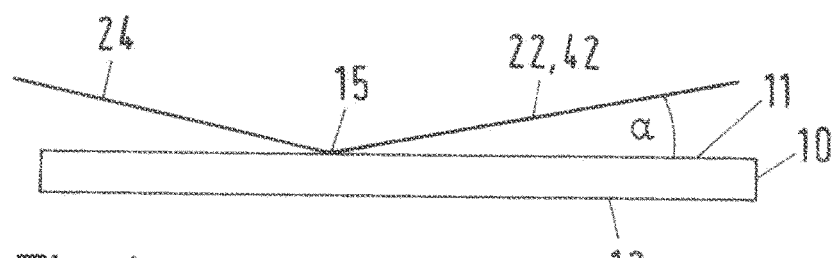
FIG. 4 is the course of the optical path of the camera and light source and the transparent object for the embodiment according to FIG. 1 in a side view.

FIG. 4 shows that the light beam 22 of each light 20 encloses an angle α with the first surface 11 of the flat glass which is, for example, smaller than 15°, preferably between 3° and 12°, and particularly preferably between 5° and 10°. Due to the small size of the angle α and the s-polarization of the incident light 22, a proportion of at least 85% of the incident electromagnetic radiation is reflected at the surface 11 when no contaminating particles are present on the first surface 11. The light 24 reflected away from the light source 20 also includes the angle α with the surface 11 of the flat glass.

Only one device according to the invention may also be provided for inspecting the entire surface 11 of the flat glass 10, or more than two devices according to the invention may be arranged side by side so that the flat glass is detected over its entire width.

The two lasers 20 are further arranged in such a way that the light passes laterally past a deflection mirror 30 in each case. This deflecting mirror 30 acts together with a line-scan camera 40, which is attached to the retaining plate 17 above the first surface 11 of the flat glass. The camera's viewing beam 41 is reflected by the deflecting mirror 30, for example at an angle of 90°, in such a way that the optical path then runs parallel and in one plane with the light beams 22 of the two lights 20 and also hits the surface 11 of the flat glass in the illuminated line-shaped area. In other words, the camera 40 observes the line-shaped area 15 of the first surface 11 with an object-side end portion 42 of the optical path of the camera 40 being in a plane with the two light beams 22 of the lights 20. Thus, as shown in FIG. 4, it also includes the angle α with the surface 11. Alternatively, the angle of the object-side end section 42 of the camera 40 that it includes with the surface 11 may differ from the angle α by less than 5°. By placing the light sources 20 and the camera 40 at the same or approximately the same angle, negative effects due to changes in position of the surface 11 of the flat glass 10 on the focus of the camera and the illumination intensity of the lasers 20 are largely prevented.

If one or more contamination particles are present in the illuminated line-shaped area 11 of the first surface 11, then this/these reflect the laser light back into the camera 40. The electromagnetic radiation reflected back into the camera by the contaminant particle(s) and is perceived by the camera as a bright spot and is detected by at least one pixel of the camera line as brightness information (intensity of the reflected light).

The data processing device 50 connected to the camera 40 (see FIG. 2) receives the intensity data detected by the camera, and the intensity data is transmitted to the line scan camera together with the assignment to each pixel. Further, the data processing device 50 knows the location of the illuminated line-shaped area 15 on the first surface 11 of the flat glass 10, and the data processing device calculates therefrom the location of the dirt particles belonging to a detected bright area of the line scan camera. For example, the detected intensity may be in a range between 0 and 255 per camera pixel. For example, if the intensity is greater than or equal to a first intensity threshold of 21 at a pixel, the data processing device 50 infers that a particle is located at the associated location of the illuminated line-shaped area. Different intensities can be assigned to particle diameters of different sizes, which are shown by way of example in the following TABLE 1.

TABLE 1

| Intensity | Particle diameter |
|---|---|
| 21-80 | 2 µm |
| 81-140 | 4 µm |
| 141-200 | 6 µm |
| 201-255 | 8 µm |

In a further possibility for evaluating the obtained intensity values of the back-reflected electromagnetic radiation, it could alternatively or additionally be proceeded in such a way that, if neighboring pixels have predetermined intensity values (e.g. in the above ranges), it is assumed that the particle extends over more than two pixels. The determined particle diameters of these neighboring pixels can then be added together, for example. Also in direction R, determined particle diameters can be added if intensity values above the first intensity threshold are determined at neighboring pixels. Other evaluations of the determined intensity values of the back-reflected electromagnetic radiation are also conceivable. In this case, the scanning speed of the camera 40 is adapted to the speed of the flat glass ribbon moving in the direction R, so that after a detection pass for one line of the camera, the flat glass ribbon has moved on in the direction R by exactly the width of the exposed line-shaped area detected by the line scan camera, so that with the next detection the next line-shaped area is detected exactly next to the previous line-shaped area.

In an alternative embodiment, not shown, the lasers 20 are not arranged next to the deflection mirror 30 but behind it. Their light passes through the deflecting mirror 30 and reaches the first surface 11 through the deflecting mirror 30. For this purpose, the deflecting mirror is designed as a partially transparent mirror.

If the contamination on the second surface 12 is to be determined, the camera, the deflection mirror and the light source are arranged in mirror-inverted fashion below the flat glass and the illumination of a line-shaped area is realized at an angle α to the second surface 12. The optical path of the camera runs on the second surface 12. The optical path of the camera also runs at the end of the object at the angle α to the second surface 12.

By means of the device according to the invention or the device according to the invention, the contamination can be determined specifically on the surface of a single side of the flat glass or other foil-type, transparent objects.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for inspecting a foil-type transparent object having a first surface on a top side and a second surface on a bottom side of the transparent object, the device comprising:
    a camera and at least one light source,
    wherein the light source is arranged so that electromagnetic radiation emitted by the at least one light source illuminates a line-shaped area of the first surface from above or of the second surface from below,
    wherein an illumination takes place at a predetermined angle (α) to a respective illuminated surface,
    wherein the camera is configured to detect an intensity of a back-reflected electromagnetic radiation in at least a portion of the line-shaped area,
    wherein the predetermined angle (α) is less than or equal to 15° and the electromagnetic radiation emitted by the light source is predominantly linear and s-polarized,
    wherein an object-side end portion of an optical path of the camera is defined at one end by a deflection mirror and at an opposite end by the illuminated surface of the foil-type transparent object, and,
    wherein the deflection mirror is partially transparent and the at least one light source is arranged behind the deflection mirror as seen from the foil-type transparent object.

2. The device according to claim 1, wherein the optical path of the camera in the object-side end portion adjacent to the illuminated line-shaped area of the respective surface encloses an angle with the optical path of the electromagnetic radiation emitted by the light source which is smaller than 20°.

3. The device according to claim 1, wherein the at least one light source is arranged next to the deflection mirror.

4. The device according to claim 1, wherein the at least one light source is designed as a laser with line optics and emits electromagnetic radiation.

5. The device according to claim 4, wherein the laser emits electromagnetic radiation with a wavelength which is in a range of visible light.

6. The device according to claim 1, wherein the camera is configured to detect the intensity of a reflected electromagnetic radiation pixel-by-pixel.

7. The device according to claim 1, wherein a data processing device is provided which is connected to the camera and to which is configured to receive a determined intensity data,
    wherein the data processing device is configured to determine from the intensity data a position, or a size, or both of particles which are arranged on the illuminated surface of the foil-type transparent object.

8. A method for inspecting a foil-type transparent object having a first surface on a top side and a second surface on a bottom side of the foil-type transparent object with a device, wherein the device comprises a camera and at least one light source,
    wherein with electromagnetic radiation emitted by the at least one light source a line-shaped area of the first surface is illuminated from above or the second surface is illuminated from below,
    wherein an illumination takes place at a predetermined angle (α) to a respective illuminated surface,
    wherein with the camera an intensity of the electromagnetic radiation reflected back is detected in at least one section of the line-shaped area,
    wherein the predetermined angle (α) is less than or equal to 15°,
    wherein the electromagnetic radiation emitted by the at least one light source is predominantly linear and s-polarized, wherein a degree of contamination of the illuminated surface is determined on a basis of the intensity detected by the camera,
    wherein an object-side end portion of an optical path of the camera is defined at one end by a deflection mirror and at an opposite end by the illuminated surface of the foil-type transparent object, and,
    wherein the deflection mirror is partially transparent and the at least one light source is arranged behind the deflection mirror as seen from the foil-type transparent object.

9. The method of claim 8, wherein the camera is aligned in such a way that the optical path of the camera, in the object-side end portion which is adjacent to the illuminated line-shaped area of a respective illuminated surface, encloses an angle with the optical path of the electromagnetic radiation emitted by the light source which is smaller than 20°.

10. The method according to claim 8, wherein the intensity of a reflected electromagnetic radiation is detected pixel-by-pixel by the camera.

11. The method according to claim 8, wherein with a data processing device, which is connected to the camera and to which the determined intensity is transmitted, a position, a size, or both of particles which are arranged on the illuminated surface of the foil-type transparent object are determined from the determined intensity.

* * * * *